UNITED STATES PATENT OFFICE.

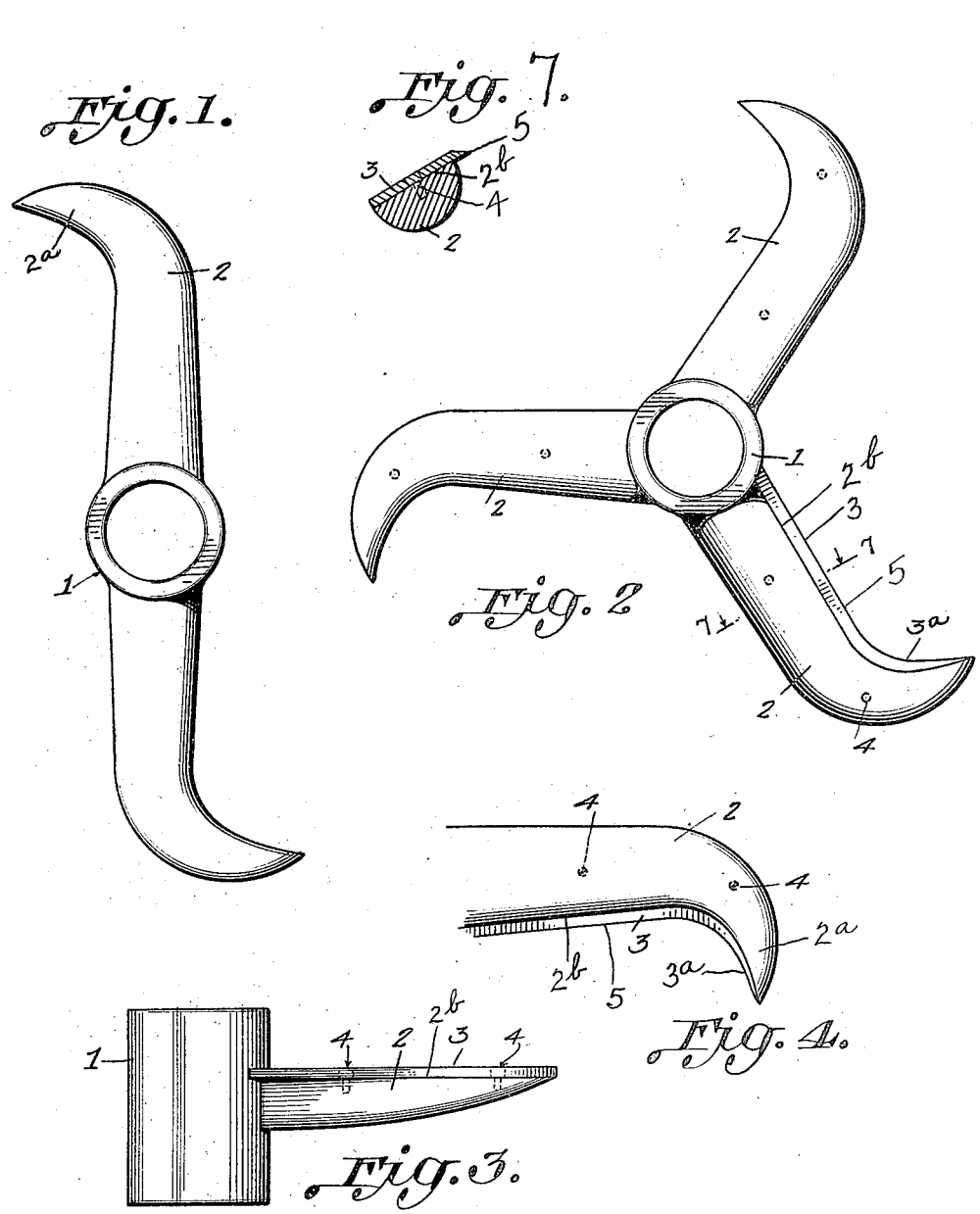

CLAUDIO GARCIA HUELVES, OF SANTA CLARA, CUBA.

CUTTER.

1,407,417. Specification of Letters Patent. Patented Feb. 21, 1922.

Application filed January 29, 1919. Serial No. 273,855.

*To all whom it may concern:*

Be it known that I, CLAUDIO GARCIA HUELVES, a citizen of the Republic of Cuba, and a resident of the city of Santa Clara, Cuba, have invented Improved Cutters Especially Adapted for Use in Machines for Picking Up and Cutting Cane Straw and Plowing Under the Same, of which the following is a specification.

This invention relates to improvements in cutters for use in machines for picking up, cutting and plowing under cane straw and the like, the object of the invention being to effect improvements in the construction of the cutters, especially as to the shape of the arms thereof to adapt the cutters for picking up the straws or stalks to be cut, and also as to the construction and arrangement of the cutter blades.

With the above and other objects in view, the invention consists in the construction, combination and arrangement of devices hereinafter described and claimed.

In the accompanying drawings:—

Figure 1 is a detail elevation of one form of rotary cutter constructed in accordance with my invention and omitting the cutting blades.

Figure 2 is a similar view showing another form of my improved cutter and also showing one of the blades in place.

Figure 3 is a detail plan of the cutter shown in Figure 1, and showing the cutter blade in place.

Figure 4 is a detail perspective view of one of the cutter blades.

Figure 7 is a detail transverse sectional view taken on the plane indicated by the line 7—7 of Figure 2.

My improved rotary cutters are especially adapted for use in connection with the machine for picking up, cutting and plowing under cane straw and the like, described and claimed in my co-pending application for Letters Patent of the United States, Serial No. 273,856, filed of even date herewith.

For the purposes of this specification, a portion of the main frame of the machine is indicated at $a$, the rear axle at $b$, the driving gear at $c$, the shaft of one set of the cutters at $d$, and the shaft of the other set of the cutters at $e$. The shaft $d$ is mounted for rotation in fixed bearings, and has a gear $f$ which engages the gear $c$. The shaft $e$ is mounted in bearings which are movable toward and from the shaft $d$, and also in a path concentric with the driving gear, and said shaft $e$ also has a gear $g$ which engages the driving gear. Hence both of the cutter shafts are driven in the same direction and the cutters thereon, when in operation, describe intersecting circular paths.

The cutters of both sets are identical in construction and hence I will describe only one of them. Each cutter comprises a hub 1 adapted to fit and to be secured firmly to the shaft and also comprises radial arms 2 which may be of any suitable number, the form of the invention shown in Figure 1 disclosing a cutter having two arms and that shown in Figure 2 disclosing a cutter having three arms. More arms may be employed if required, according to the nature of the straw, cane, stalks or other vegetable matter to be picked up and cut by the machine. Each cutter arm has a curved hook-shaped outer end, as at $2^a$, and is flat on one side as at $2^b$.

Associated with each cutter arm is a cutter blade 3 which is adapted to be secured on the flat side of the arm, as by means of suitable bolts arranged in openings 4. Each cutter blade corresponds in shape with the cutter arm to which it is attached, and has a curved hook-shaped outer end $3^a$. The width of the cutter blade somewhat exceeds that of the cutter arm, so that one edge of the cutter blade, on the front side, in the direction of rotation of the cutter, projects in advance of the arm and the said projecting edge is bevelled on one side and sharpened as at 5.

Figure 5:
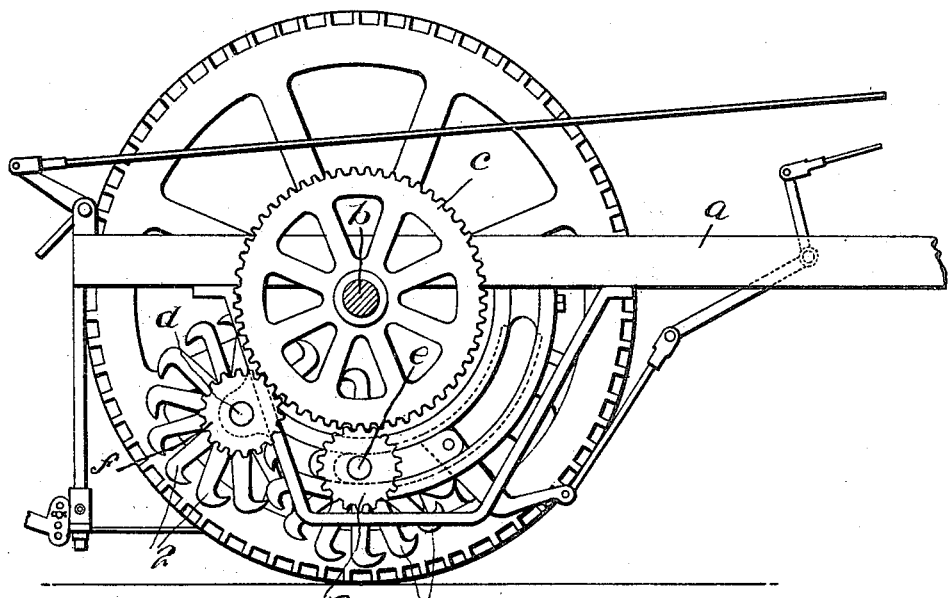
Figure 5 is a detail elevation of a portion of a machine for picking up, cutting and plowing under cane straw and the like, and provided with my improved cutters.
Figure 6:
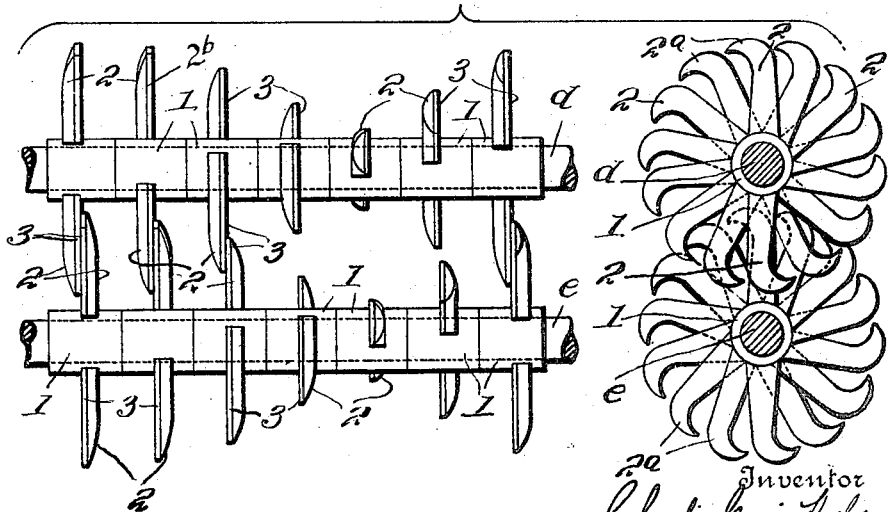
Figure 6 is a detail plan of the cutters showing how the two sets of cutters coöperate.

The cutters of the respective shafts, when the shafts are so adjusted as to be arranged for operation, rotate in intersecting circles, and the cutters are so arranged on the shafts that their cutting blades operate in pairs, as indicated in Figure 6, and move simultaneously in reverse directions and in mutual contact flatwise. Owing to the hook shape of the cutter arms and blades the same operate efficiently to pick up the straws, canes or stalks from the ground, and the cutters also exert shearing action on the said material and hence cleanly cut the same. Any suitable number of the cutters may be employed on each shaft and the blades thereof may be appropriately spaced apart according to the length into which it is desired to cut the straw.

Having thus described my invention, I claim:—

1. A revoluble cutter of the class described comprising radial arms having hook-shaped outer ends projecting forwardly in the direction of rotation, each of said arms having a flat side, and blades on said flat side of the arms and conforming in shape therewith, said blades being wider than said arms and presenting projecting sharpened cutting edges on the front sides of said arms.

2. Two sets of revoluble cutters for use on a machine for picking up and cutting cane straw and the like, each set comprising a plurality of revoluble cutters having radial arms with hook-shaped outer ends and correspondingly shaped cutting blades on the opposing sides of the respective cutters, said sets of cutters being arranged for operation in intersecting circular paths and with the blades of the cutters of said sets arranged for cooperative shearing action.

CLAUDIO GARCIA HUELVES.